PER CENT OF TRIMELLITIC ANHYDRIDE (WET)

INVENTORS.
WILLIAM H. POWELL
LEON B. PALMER
BY ROBERT P. CONGER

ATTORNEY

United States Patent Office 3,552,997
Patented Jan. 5, 1971

3,552,997
PROCESS OF PREPARING CELLULAR LAMINATES HAVING A NONCELLULAR SURFACE STRATUM
William H. Powell, Livingston, Leon B. Palmer, Little Falls, and Robert P. Conger, Park Ridge, N.J., assignors, by mesne assignments, to Congoleum Industries, Inc., Kearny, N.J., a corporation of Delaware
Filed July 25, 1968, Ser. No. 747,512
Int. Cl. C08j 1/30; B32b 5/20
U.S. Cl. 117—72
17 Claims

ABSTRACT OF THE DISCLOSURE

This invention relates to a cellular foam laminate having a noncellular surface layer. The laminate is prepared by incorporating in a foamable resinous composition a thermodecomposable chemical blowing agent and an accelerator which is substantially insoluble in the resinous composition and which lowers the temperature at which the blowing agent decomposes. The resinous composition is then formed into a solid layer and an inhibitor is applied uniformly over the surface. The inhibitor is a compound which is at least partially soluble in the foamable resinous composition and will combine with the accelerator to prevent it from lowering the decomposition temperature of the blowing agent. The penetration of the inhibitor is controlled so that it only penetrates in effective concentration to the thickness desired for the wear layer. The composition is then carefully heated to decompose the blowing agent in contact with the accelerator without decomposing the blowing agent in the area of inhibitor penetration.

BACKGROUND OF THE INVENTION

This invention relates to cellular foam products and particularly to methods for producing cellular foam products having a solid, noncellular surface layer and to the products thus produced.

Sheets of resinous composition have found widespread use as decorative and wear-resistant coverings for a wide range of products. Such sheets, for example, are used extensively as wall, floor and table coverings, book covers, decorative containers, as fabrics for use as upholstery, clothing and automobile interiors, and the like. In many instances, the resinous composition sheets are applied or formed on backings such as woven fabrics, paper, felt, metal, wood, glass, and the like. These backing materials have many purposes, the most common being added strength and serviceability.

The introduction of cellular resinous compositions has led to their incorporation in products such as recited above. The cellular foam sheet gives the product various desirable properties, depending on the type of cellular foam, such as high resiliency and good feel or "hand." The cellular composition sheet is used in combination with a noncellular resinous composition surface and/or backing to give the product the necessary strength and/or wear resistance. The noncellular layer is usually formed by coating or laminating the layer to the cellular sheet. Typical of the methods used are those disclosed in the following U.S. patents: No. 2,964,799, issued Dec. 20, 1960 to Roggi et al., No. 3,239,365, issued Mar. 8, 1966 to Petry, and No. 3,293,094, issued Dec. 20, 1966 to Nairn et al.

It has been suggested in U.S. Pat. No. 3,293,094 that a cellular foam resinous product can be produced which has an embossed surface by applying to a foamable composition containing a blowing agent in the areas where embossing is desired an inhibitor and thereafter heating the composition to decompose the blowing agent. The inhibitor migrates into the area where it is applied to retard or accelerate the decomposition of the blowing agent in such area to produce raised or depressed areas. This process has the advantage that the embossing can be in complete register with the printed design. The inhibitors disclosed in the Nairn et al. patent can function in a number of ways. They can react or otherwise complex with the blowing agent or they can act similarly with accelerators which are conventionally added to blowing agents to lower their decomposition temperature.

The primary object of the invention is to provide a simple process for producing a novel cellular resinous composition product having a solid, noncellular surface. Another object is to produce such a product by utilizing standard processing equipment. A further object is to provide such a process which is readily adaptable to curved and irregular surfaces. Other objects and the advantages of the invention will appear hereinafter.

SUMMARY OF THE INVENTION

In accordance with the invention, it has been discovered that it is possible to produce a cellular foam composition sheet having a surface of a noncellular composition structure from a foamable resinous composition containing a thermally decomposable blowing agent and an accelerator which lowers the decomposition temperature of the blowing agent. This is accomplished by converting the foamable composition to a solid layer and then applying a uniform layer of an inhibitor to the surface of the solid composition. The composition is thereafter heated to decompose the blowing agent. The amount of inhibitor application is controlled so that under the conditions to which the composition is subjected only sufficient inhibitor, in effective concentration, will penetrate to react with the accelerator (and thereby prevent it lowering the decomposition temperature of the blowing agent) to the depth or thickness desired in the solid noncellular stratum of the composition. Since the blowing agent in the area where the accelerator has been effectively removed will decompose if heated to a sufficiently high temperature, it is essential to control the time and degree of heating to prevent such decomposition. It is essential to the invention that the accelerator for the blowing agent be insoluble or substantially insoluble in the foamable resinous composition. Without such insolubility, it is impossible to remove sufficient accelerator to prevent foam formation in the solid noncellular layer. "Noncellular" in the specification and claims means at least 85% of the area free of cells and any cells remaining are fairly uniformly dispersed in the noncellular layer. Such a layer preferably has a density of at least 60 pounds per cubic foot.

This process can be conveniently carried out by applying the inhibitor in the form of an ink composition. The inhibitor composition can be transparent so that the appearance of the product is not altered. Alternately, the inhibitor can be part of a colored ink composition so that the colored ink or colors of the inks appear on the surface of the product. Further, the inhibitor can be applied to a supporting base, such as a release paper and a solid resinous layer applied over the inhibitor. Alternately, it can be applied on the underside of the resinous layer.

The depth of the noncellular layer can be controlled by varying the concentration, type of inhibitor and/or post-application heating. This varied concentration can be affected by the amount of vehicle applied as well as the concentration of the inhibitor in the ink or carrier composition. Other factors which can affect the depth of the noncellular layer are time-temperature cycle for decomposing the blowing agent, the amount of accelerator, any interfering chemical compounds in the resinous layer, viscosity of the resinous composition at the temperatures required to obtain desired decomposition of the blowing agent, and the like. The noncellular layer should be at least 0.003 inch in thickness to obtain the minimum strength characteristics required for structural strength and/or wear resistance.

This discovery makes possible the production of a product having a solid, noncellular surface in one simple operation. Further, it allows the formation of such a surface without exerting pressure on the surface and without regard to the shape of the surface. The number of products which can be produced by the process is unlimited. It can be used for producing floor, wall and ceiling coverings, drapery, upholstery and clothing materials, tents and the like, and, in fact, wherever resinous plastic sheets or compositions are utilized. It is readily adaptable to any surface on which foamable compositions can be applied such as automobile interiors, boots, boxes and packing cartons, book covers, maps, road markers, glass and plastic containers, and the like. The process can also be combined with that disclosure in Nairn et al. U.S. Pat. No. 3,293,094 to produce a cellular foam product having an embossed surface as well as a noncellular surface layer.

DESCRIPTION OF THE DRAWINGS

The invention will be better understood from the following detailed description of various embodiments of the invention when read in connection with the drawings wherein.

DESCRIPTION OF PREFERRED EMBODIMENT

In accordance with one embodiment of the invention a resinous vinyl polymer cellular foam sheet is produced having a solid, noncellular surface layer by applying to a base a layer of resinous vinyl polymer composition containing a blowing agent and accelerator which lowers the decomposition temperature of the blowing agent, heating the coating to at least partially gel the composition without decomposing the blowing agent to yield a relatively solid surface, printing or otherwise applying on the surface of the gelled sheet a uniform layer of composition containing an inhibitor which will render the accelerator ineffective in lowering the temperature at which the blowing agent will decompose and thereafter heating the composition to fuse the compositions and decompose the blowing agent and form a cellular foam composition with a noncellular wear layer. The heating must be carefully controlled so that the temperature of the composition is sufficient to decompose the blowing agent in the areas which do not contain the inhibitor without decomposing it in the areas containing the combination of blowing agent and inhibitor. As a general rule, it is desirable to have at least 20° F. difference between the temperature at which the area containing the inhibitor will foam and compared to the other areas of the composition. The portions of the foamable layer contacted by the inhibitor will not foam. This is caused in this illustration by a chemical reaction taking place between the inhibitor and the accelerator it contacts which prevents it from affecting the decomposition temperature of the blowing agent. The finished product has a cellular layer covered completely by a solid, noncellular layer. This procedure provides a simple method for producing a foam product having a substantially thick wear-resistant surface layer.

As an alternate method, the inhibitor can be printed or otherwise applied to a supporting base and then the foamable composition applied as a solid layer over the inhibiting agent. Additionally, the foamable composition can be formed into a fused or partially fused sheet without decomposing the blowing agent, such as by calendering, and then the inhibitor applied to either surface of the sheet.

One arrangement of apparatus is shown in the drawings. Referring to the drawings, a web, such as a felt sheet 11, is placed on a conveyor, as for example, a continuous belt 22. A coat 19 of resinous composition 20 containing a chemical blowing agent and accelerator is applied to the upper surface of the base 11 by any suitable means such as a reverse roll coater, a doctor blade or similar coating apparatus. If a doctor blade 18 is used, a reservoir of the resinous composition 20 is maintained behind the blade allowing a uniform coat of the composition to be applied to the surface of the felt. The coated base is then passed through a heating unit generally indicated at 30 which can be any conventional heating means such as a bank of infrared heating lamps 31 or forced hot air. The heating unit supplies sufficient heat to at least partially gel the thermoplastic resinous coating without decomposing the blowing agent. The gelled coating is then cooled by any suitable unit such as a blower 33 and passed to a second coating station, generally indicated at 39, which can be a printing apparatus containing a printing cylinder 40. The printing cylinder 40 picks up printing composition 42 on its etched surface and applies a uniform coating 44 of the printing composition on the entire surface of the gelled layer. The printing composition is then dried. If desired, additional printing cylinders, such as 41, with associated ink composition 43, can be utilized to print a design 45 on the surface of the gelled sheet. The coated gelled sheet 46 is then passed through a heating unit generally indicated at 51. The heating unit can be any heating apparatus such as a hot air oven or infra-red heat lamps. It is preferred to have a heating unit which heats both surfaces of the sheet. The heating unit raises the temperature of the compositions on the base sheet sufficiently high to completely solvate and fuse the composition and cause the selective decomposition of the blowing agent contained in the under portion of the composition without decomposing the blowing agent where the inhibitor is present in the upper portion of the foamable layer. The product 53 is thereafter passed through a cooling chamber generally indicated at 55 to cool the product. The areas of the foamable composition layer 56 not contacted by the inhibitor have reached their maximum expansion whereas the portions of the foamable composition contacted by the inhibitor 57 have not foamed at all.

The type of backing web, if utilized, would depend in large measure on the product to be produced. If the backing web is to remain as part of the finished product, then it can be formed of a resinous composition, felted sheet, woven or knitted fabric or the like. Any of the thermoplastic or elastomeric resinous compositions which can be formed into a sheet can be used to form backing sheets for use in the invention. Typical of the resins which can be compounded with plasticizers and fillers and sheeted to form a sheet are such resins as butadiene-styrene copolymers, polymerized chloroprene, polyvinyl chloride, polyvinyl acetate, vinyl chloride-vinyl acetate copolymers and the like. In some cases, scrap and degraded resinous compositions can be salvaged by forming them into sheets which can be used as backing sheets in producing products in accordance with the invention.

As indicated, suitable backing sheets also include woven fabrics formed of such fibers as cotton, wool, asbestos and various synthetic fibers. Where loosely woven fabrics such as burlap are used, the fabric can be sized to prevent passage of the coating composition through the openings between the fibers by utilizing the conventional sizing composition used in the textile industry or a very viscous application of the coating composition which is to be applied. The coating can be dried or hardened quickly before it passes through the fabric.

Felted cellulose or mineral fibrous sheets are particularly useful in accordance with the invention for producing products for use as surface coverings since they are low in cost and yet are flexible and strong. The sources of cellulose can include cotton or other rags, wood pulp, paper boxes, or mixtures thereof in any proportion. Asbestos is the most commonly used mineral fiber. A felted fibrous sheet as produced by conventional sheet-forming techniques is usually unsatisfactory, if it is going to remain as part of the product, without impregnation with a water-resistant and strengthening impregnant, due to poor strength and water resistance. Suitable impregnants include vinyl resin, such as polymers of vinyl chloride and vinyl acetate. Particularly suitable are copolymers of vinyl acetate and vinyl chloride or these monomers copolymerized with other monomers copolymerizable therewith. In addition, polymerized acrylic and methacrylic acids, esters and their polymerized derivatives, polyethylene, polystyrene, butadiene-styrene copolymer, butadiene-acrylonitrile copolymer, polymerized chloroprene, and similar synthetic rubber-like polymers, natural rubber, and the like are suitable. These resins can be incorporated into the felted fibrous sheet by impregnation of the sheet with an emulsion or solution of the resin followed by drying of the sheet to remove the solvent. Alternately, the resin can be added in fine particles to the fiber furnish prior to sheet formation either as solid particles of resin or as an emulsion in water or other emulsifying vehicle.

If the backing is to be removed from the final product, it is preferably a release paper. Such a paper conventionally has a coating on its surface to allow the plastic sheet to be easily stripped from the paper. Typical coatings used as clays, silicone compositions, polyvinyl alcohol, and similar special compositions well-known in the art.

In accordance with the invention, a foamable resinous polymer composition is applied to the base. The resinous binder is preferably one that is coalesced or fused into a continuous film by the application of heat since this allows gelling of the composition to produce a good printing surface. In this specification and claims, the term "fused" is intended to mean that state which is achieved in a resinous composition during the transition from a random dispersion or suspension of discrete resin particles in plasticizer to one of a homogeneous consistency and uniform viscosity and rheological characteristics.

The foamable composition is also preferably a dispersion of resin in a liquid medium. The dispersion medium can be water in the case of an aqueous latex, organic solvent as an organosol, or plasticizer as a plastisol. Best results have been obtained with a dispersion of resin in a plasticizer which is conventionally termed a plastisol. A plastisol has appreciable fluidity at normal room temperature, but is converted by heat into a fused, flexible, tough thermoplastic mass. Plastisols are preferred since it is unnecessary to remove large volumes of carrier as is necessary with a latex or organosol.

The preferred and most widely used resin for surface coverings are polymers of vinyl chloride. The vinyl chloride polymers can either be simple, unmixed homopolymers of vinyl chloride or copolymers, terpolymers or the like thereof in which the essential polymeric structure of polyvinyl chloride is interspersed at intervals with the residues of other ethylenically unsaturated compounds polymerized therewith. The essential properties of the polymeric structure of polyvinyl chloride will be retained if not more than about 40 percent of the extraneous comonomer is copolymerized therein. Suitable extraneous comonomers include, for instance, vinyl bromide, vinyl fluoride, vinyl esters such as vinyl acetate, vinyl chloroacetate, vinyl butyrate, other fatty acid vinyl esters, vinyl alkyl sulfonates, and the like; vinyl ethers such as vinyl ethyl ether, vinyl isopropyl ether, vinyl chloroethyl ether and the like; cyclic unsaturated compounds such as styrene, the mono- and poly-chlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds such as vinylidene chloride, vinylidene bromide, vinylidene fluorochloride and the like; unsaturated hydrocarbons such as ethylene propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3-piperylene, divinyl ketone and the like. Although such vinyl chloride resins are preferred, as is apparent, the compositions can be formed from any resin which can be foamed with a blowing agent and the invention is not intended to be limited to any particular resin or group since many other types and groups of resins will occur to those skilled in the art and the particular resin selected does not form part of the invention. Other resins which can be mentioned, however, are polyethylene; polypropylene; methacrylates; synthetic rubber, such as neoprene, silicone, SBR and nitrile; polyurethanes; polyamides; polystyrene; phenolics, urea-formaldehydes; cellulose esters-epoxy; and silicones.

Resins adaptable for use in formulating vinyl plastisols are commonly referred to as dispersion grade resins. Such resins are available having particle sizes of from about 0.02 to about 2 microns in contrast to calender grade vinyl resins which are available in particle sizes ranging up to 35 microns. Dispersion grade resins are usually of higher molecular weight than calender grade resins and have particle surfaces of a hard, horny nature. Polymers of vinyl chloride having specific viscosities above about 0.25 and preferably between 0.30 and 0.70 as measured in a solution of 0.4 gram of resin in 100 milliliters of nitrobenzene at 30° C. are particularly effective (ASTM D1243-60). Specific viscosity is a comparison of the flow time for a control of pure nitrobenzene solvent as compared to the solution of nitrobenzene and resin. The specific viscosity is determined as the sample flow time divided by the control flow time, minus 1. The specific viscosity is an effective measure of relative molecular weight of the polymer, the higher the specific viscosity the higher being the molecular weight. The lower specific viscosity resins are preferred.

In the formulation of plastisol compositions for use in the invention, the fine particle size resin is uniformly dispersed in a mass of fluid plasticizer. The fluidity of plastisols is influenced in part by the particular resin and plasticizers selected, but is also a function of the ratio of plasticizer to resin. Plastisols become less fluid as the ratio of plasticizer to resin is reduced. Coating compositions for use in the invention preferably contain from about 20 to about 150 parts plasticizer per 100 parts resin with a range of about 50 to about 100 parts plasticizer per 100 parts resin being particularly effective. The viscosity of plastisol compositions can also be reduced by the addition of small amounts of a volatile diluent not exceeding about 10 parts per 100 parts resin. Useful diluents include benzene, toluene, methyl ethyl ketone, petroleum solvents such as V. M. and P. Naphtha (boiling range of 190–275° F.) and the like. Organosols for use in the invention preferably contain about 20 to about 55 parts of plasticizer per 100 parts of resin with about 30 to 40 parts of plasticizer per 100 parts of resin being particularly preferred, whereas plastisols usually contain about 45 to about 150 parts of plasticizer per 100 parts of resin. The amount of solvent utilized depends in large measure on the coating viscosity best suited for the coating apparatus utilized. If calendered sheets or preformed sheets are utilized, the plasticizer level can be lower.

The selection of the plasticizer is important in determining the strength and flexibility of the composition and also in influencing the viscosity and viscosity stability of the composition and the foaming characteristics of the foamable composition. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di(2-ethylhexanoate), diethylene glycol dipelargonate, triethylene glycol dicaprylate, 2,2,4-trimethyl-1,3-pentane diol diisobutyrate, and the like. Plasticizers of the aromatic type, such as esters of aliphatic alcohols and aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer or blend of plasticizers is chosen to yield a composition of the desired viscosity and/or foaming characteristics. In addition, the plasticizer should preferably have a low vapor pressure at the temperatures required to fuse the resin. A vapor pressure of two millimeters of mercury or less at 400° F. has been found particularly satisfactory.

Minor amounts of stabilizers are usually incorporated in the foamable compositions to reduce the effects of degradation by light and heat. Suitable stabilizers include phenyl phthalate, phenyl benzoate, o-tolyl benzoate, o-nitrophenol, epoxidized esterified tallate, epoxidized soya bean oil, alkyl and aryl phosphites, such as diphenyl decyl phosphite and/or triphenyl phosphite, benzotriazoles such as 2-(2'-hydroxy-5'-methylphenyl) benzotriazole, o-hydroxybenzophenones, 2-cyano-3-phenyl cinnamate, salicylates, and other complexes. Normally, the compositions contain about 0.1 to about 5 parts stabilizer per 100 parts resin. The stabilizer can have the dual function of also serving as an accelerator for the blowing agent and, therefore, careful selection is necessary to obtain the desired results.

The foamable compositions can contain pigments in accordance with the particular color desired. Any of the organic and inorganic pigments well known in the art for plastic compositions can be used. It should be noted, however, that some pigments can have an accelerating effect on the decomposition of blowing agents. Normally, from about 0.5 to about 5 parts of pigments per 100 parts resin are used.

The foamable compositions contain, in addition, an effective amount of blowing agent. The larger the amount of blowing agent within practical limits used, the greater is the expansion of the foam. The density of the non-foamed composition is usually above 70 pounds per cubic foot, but in some formulations can be as low as 50 pounds per cubic foot because of occlusion of air in preparation.

Foam densities are about 12 to about 40 pounds per cubic foot. Such foam densities are attainable with from about 0.1 to about 20 parts blowing agent per 100 parts resin. About 0.5 to 5 parts blowing agent per 100 parts resin is particularly effective for the production of foams of a density which are most desirable for use in most surface coverings in accordance with the invention.

Blowing agents are well known in the art and the particular blowing agent selected usually depends on such matters as cost, resin and density desired. While many compounds decompose by giving off a gas, only a relatively few are produced commercially in quantity. Complex organic compounds which, when heated, decompose to yield an inert gas and have residues which are compatible with the resin are preferred as blowing agents. Such materials have the property of decomposition over a narrow temperature range which is particularly desirable to obtain a good foam structure. The decomposition takes place in half lives and, therefore, time of heating is also a factor.

Typical types of blowing agents which can be mentioned include substituted nitroso compounds $$(R{-}N{-}R') \atop {\displaystyle |} \atop NO$$

substituted hydrazides (RSO$_2$NHNHR'), substituted azo compounds (R—N=N—R'), acid azides (R—CON$_3$), guanyl compounds $$(NH{=}C{-}NH_2) \atop {\displaystyle |} \atop R$$

and the like wherein R and R' are hydrogen or hydrocarbon groups usually containing from one to ten carbon atoms.

Typical blowing agents with their decomposition temperature ranges in vinyl chloride resinous compositions are shown in Table I:

TABLE I

| Blowing agent | Decomposition temperature, ° F. |
|---|---|
| Azodicarbonamide (NH$_2$CN=N—C—NH$_2$)  | 325–400 |
| p,p'-Oxybix (benzene sulfonyl hydrazide) | 250–300 |
| Azobisisobutyronitrile | 220–250 |
| N,N'-dimethyl-N,N'-dinitrosoterephthalamide | 190–220 |
| Diazoaminobenzene | 212–266 |
| p-Toluene sulfonyl semicarbazide | 415–435 |

Additional blowing agents which can be mentioned which are believed to be effective are N,N'-dinitrosopentamethylenetetramine, aminoguanidine bicarbonate, p,p'-thiobis(benzene sulphonhydrazide), p,p'-diphenylmethane disulphonhydrazide, benzene m-disulphonhydrazide, benzene sulphonhydrazide, terephthalazide, benzazide, p-tert.-butyl benzazide, phthalazide, isophthalazide, 1,3-diphenyltriazene, azohexahydrobenzonitrile, azo dicarboxylic acid diethyl ester, naphthalene-1,5-disulfonyl hydrazide and biuret.

Blowing agents for use in the invention must be decomposed an effective amount at a temperature below the decomposition temperature of the resin used. The preferred blowing agents are those that decompose above the elastomeric point of the resin composition since this enables at least partial gelling of the foamable composition. Such blowing agent usually decomposes above 200° F. As an illustration, with the preferred vinyl chloride polymers, a blowing agent decomposing between about 300° F. and about 450° F. can be used. The minimum initial decomposition temperature must be sufficiently high to prevent premature gas evolution occurring during processing. In some instances, a combination of blowing agents can be used to advantage.

It is essential to the invention to utilize a blowing agent which can be accelerated or catalyzed to lower the decomposition of the blowing agent. It is also essential that the accelerator is a compound insoluble or substantially insoluble in the foamable composition. Typical types of accelerators are various metal compounds of lead, zinc, cadmium and tin, such as dibasic lead phosphite, dibasic lead phthalate, tribasic lead maleate, tetrabasic lead fumarate, lead stearate, lead acetate, lead oxide (PbO and $Pb_3O_x$), lead subacetate, zinc oxide, zinc acetate, zinc laurate, zinc dust, cadmium stearate, cadmium oxide, cadmium acetate and cadmium barium laurate. These agents can also serve as stabilizers for the composition. Zinc oxide and dibasic lead phosphite are the preferred accelerators since they apparently require substantially less amounts of inhibitors than the other accelerators and are excellent stabilizers. The accelerator, as a general rule, should be utilized in as small a concentration as possible since this permits the thickest possible solid non-cellular layer. The preferred amounts with azodicarbonamide are from 0.03 to about 0.10 mol of dibasic lead phosphite per mol of blowing agent. With zinc oxide, the mols should be 0.15 to about 0.65 per mol of azodicarbonamide.

The foamable composition is formed into a film of the desired thickness and then heated to gel the composition to give a good surface for the application of the inhibitor. It is desirable that before application of the foamable composition, it is treated to remove as much entrapped air as possible since such air can cause air bubbles in the final noncellular layer. In this specification and claims, the term "gel" includes both the partial and complete solvation of the resin or resins with the plasticizer (fused). The heating is limited as to the time and temperature to prevent the decomposition of the blowing agent in the composition. When using the preferred polyvinyl chloride composition, the temperature of the composition is preferably raised to about 240° F. to about 275° F. Generally, the actual oven temperature would be a slightly higher temperature to have the composition reach the desired temperature. If the foamable composition is to be formed into a self-supporting film, then the temperature would conventionally be high enough to fuse the composition. The degree of solvation of the resin can have an effect on the penetration of the inhibitor. As a general rule, the lower the solvation, the better the penetration.

The degree of foaming of a typical plastisol formulation using different concentrations of blowing agent with an accelerator (dibasic lead phosphite) is shown in Table 2:

TABLE 2

| Parts azodicar-bonamide per 100 parts resin | Ratio of foam thickness to original thickness | Density, lbs. per cu. ft. |
| --- | --- | --- |
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

Table 3 gives the preferred temperature and time relationship using the preferred polyvinyl chloride resin:

TABLE 3

| | Resin temperature, ° | Oven temperature temperature (° F.) circulating air | Exposure time, seconds |
| --- | --- | --- | --- |
| Film conditions: | | | |
| Elastomeric point | 240–300 | 250–400 | 10–300 |
| Fused | 340–375 | 350–450 | 60–240 |
| Blown | 340–400 | 350–450 | 60–240 |

The time required to reach the elastomeric point will depend in part on the film thickness and particular base as shown in Table 4:

TABLE 4

| | Film thickness, inch | Time/ temperature, seconds/ ° F. |
| --- | --- | --- |
| Base: | | |
| A* | 0.008 | 45/300 |
| A* | 0.014 | 60/300 |
| B** | 0.014 | 90/300 |

*A cellulosic felt of 0.025 inch thickness impregnated with 25 percent vinyl acetate homopolymer.
**A cellulosic felt of 0.043 inch thickness containing 5 percent of a cured ureaformaldehyde resin and 25 percent of butadiene-acrylonitrile polymer.

While the foamable composition is described as being applied as a coating to the base, it is apparent that this composition can also be applied as a preformed sheet or the composition can be molded, extruded, calendered or otherwise formed into any desired shape depending on the ultimate use of the product.

The inhibitor for the accelerator is applied to one surface of the resinous polymer composition in a uniform layer. The inhibitor is preferably applied in a liquid carrier which allows better control of the concentration of inhibitor applied. If the inhibitor is not soluble in the carrier, it can be dispersed with the carrier in the conventional paint-making technique to produce a fine dispersion. One of the easiest methods of applying the inhibitor-containing composition is by utilizing any of the conventional printing techniques such as off-set or direct rotogravure printing. As previously indicated, the inhibitor composition can be transparent or pigmented. It is conveniently formulated in the manner of a printing ink. Such compositions usually contain a carrier for the pigment, such as a vinyl resin, and, in some cases, a plasticizer for the resin to give good adhesion to the printing surface. The inhibitor for the blowing agent (system) is an agent which alters the decomposition temperature of the blowing agent in the area of the foamable composition above or below where it is deposited. By varying the concentration of the inhibitor, the thickness of its application or its penetration (solubility or diffusibility) rate into the foamable composition, the degree of suppression of the decomposition of the blowing agent can be controlled to produce foam layers having wear layers of various thicknesses.

The choice of an inhibitor will depend on a number of factors. The most important are the particular blowing agent utilized in the system, the stabilizer and plasticizer in the composition and the fusion and decomposition temperature of the resin. Since all of these factors play a part, it is important to determine the suitability of any particular system by a simple test. The foamable composition to be tested is coated, or otherwise applied, on a base, heated to gel or partially harden the composition if this can be accomplished without decomposing the blowing agent. Spaced parallel lines of a thickness of about 0.5 inch of the test ink containing the inhibitor are then applied on the surface of the gelled coating in various concentrations, as for example, 5, 20 and 50 percent of the inhibitor. The sample is then carefully heated to fuse the composition and decompose the blowing agent in the areas desired. The effect of the particular inhibitor with the particular composition and conditions can readily be observed by viewing a cross-sectional cut of the sheet. As a general rule, it is desired to have at least 20° F., and preferably as much as 50° F., difference between the temperature at which the blowing agent will decompose and that at which the accelerated blowing agent will decompose.

Compounds which have been found particularly effective as inhibitors to react with the accelerator for the blowing agent are organic acids, organic acid halides and compounds which will yield acid radicals under the reaction conditions.

Typical organic acids for use as inhibitors are maleic, fumaric, adipic, malic, citric, salicylic, trimellitic, trimellitic anhydride, pyromellitic, malonic, 1,2-phthalic, anthranilic, oxalic, 2,6-dihydroxybenzoic, sorbic, trimesic, isosebacic and glutaric, dihydroxytartaric, m-aminobenzoic, p-aminobenzoic, terephthalic, azelaic, barbituric, 2,3-pyridinedicarboxylic and ascorbic acid. As a general rule, the most useful acids are those having at least two carboxyl groups or those having at least one carboxyl group and one hydroxy group and which contain from 2 to 12 carbon atoms.

Typical organic acid halides which can be used as inhibitors for lead accelerators are preferably those which contain from 2 to 20 carbon atoms and particularly the chlorides. Typical examples are trimellitic anhydride monoacid chloride, stearoyl chloride, phthaloyl chloride, benzoyl chloride, palmitoyl chloride, cinnamoyl chloride, fumaryl chloride, 1-naphthoyl chloride, terephthaloyl chloride, p-nitrobenzoyl chloride, 4-methoxybenzoyl chloride, isophthaloyl chloride, terephthaloyl chloride, trichloroacetyl chloride, bromoacetyl bromide, chloroacetyl chloride, phenylacetyl chloride, acetyl bromide, n-butyryl chloride, propionyl chloride, iso-valeryl chloride, n-valeryl chloride, 2-bromopropionyl bromide, dichloroacetyl chloride, oxalyl chloride, lauroyl chloride, myristoyl chloride, succinyl chloride, hexanoyl chloride, hydrocinnamoyl chloride, adipyl chloride, iso-butyryl chloride, 4-methyl-n-valeryl chloride, crotonyl chloride, 2-chloropropionyl chloride, 2-phenoxypropionyl chloride, phenoxyacetyl cholride, propionyl bromide, iso-butyryl bromide, n-valeryl bromide, 2-bromo-2-methylpropionyl bromide, sebacyl chloride, cyclohexanecarboxyl chloride, ethyl oxalyl chloride, dichloroisocyanuric acid, 10-undecenoyl chloride, undecanoyl chloride, benzoyl bromide, m-bromobenzoyl bromide, o-chlorobenzoyl chloride, anisoyl chloride, 2-furoyl chloride, 2-naphthoyl chloride, m-bromobenzoyl chloride, 2,4-dichlorobenzoyl chloride, p-phenylazobenzoyl chloride, and 1-nitro-2-anthraquinonecarboxyl chloride and carbohydrates, such as d-maltose, d-galactose, d-glucose and fructose have proven useful.

Figure 1:
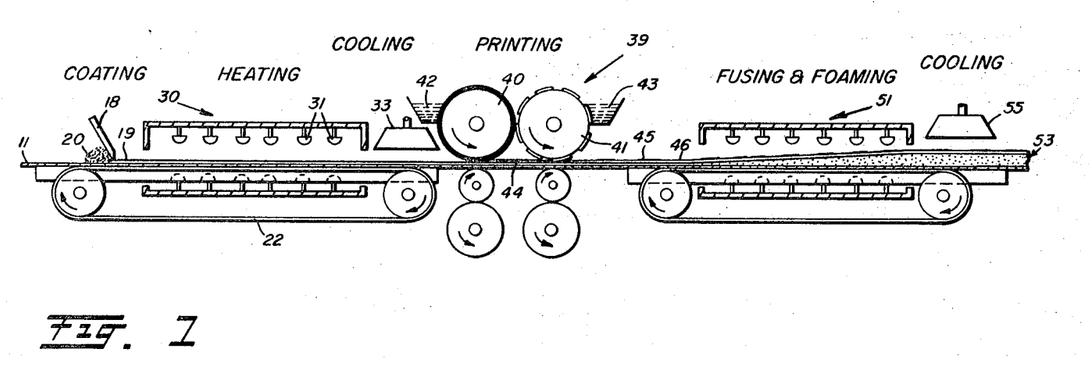
FIG. 1 is a schematic representation of one method of producing a sheet in accordance with the invention.
Figure 2:
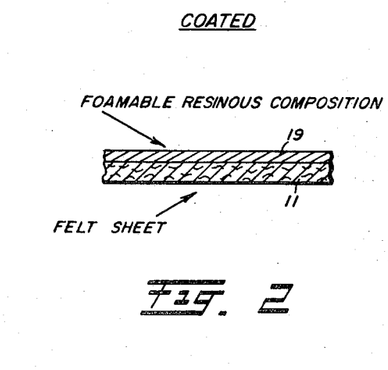
FIGS. 2 to 4 are enlarged cross-sectional views of the product in various stages of manufacture as shown in FIG. 1, the relative relationship of the various layers are not in proportion.
Figures 3, 4:
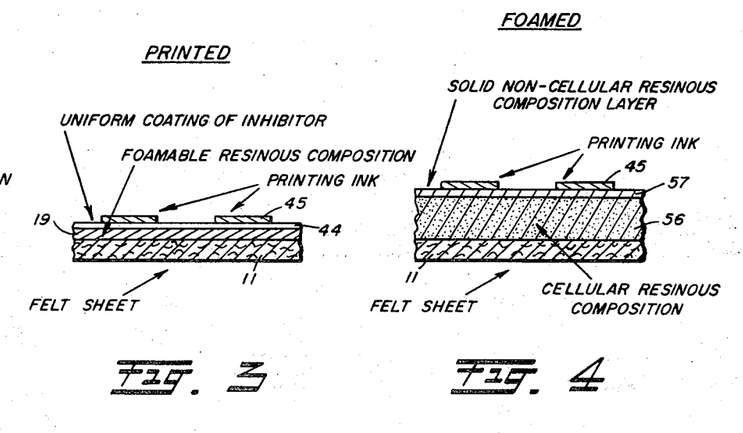
Figure 5:
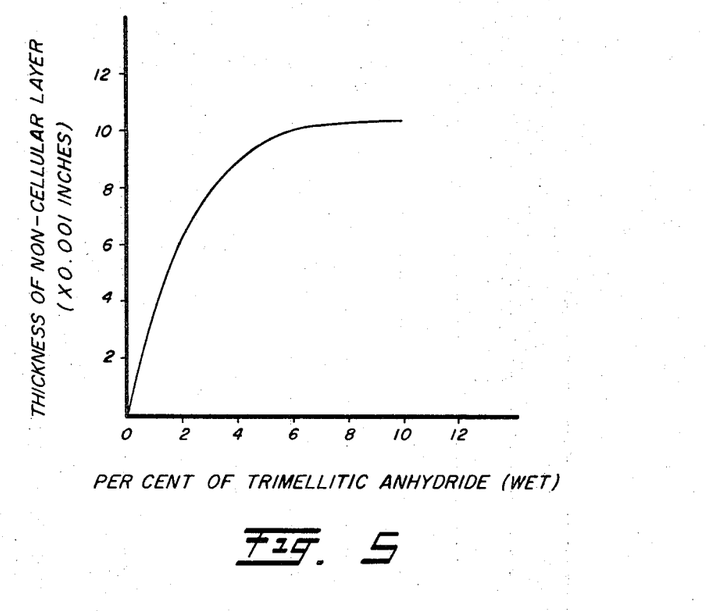
FIG. 5 is a graph showing the relationship between concentrations of inhibitor and thickness of noncellular layer in a typical foamable resinous composition containing 100 parts of polyvinylchloride, 57 parts of plasticizer, 2.53 parts of azodicarbonamide and 1.11 parts of dibasic lead phosphite.

The amount of inhibitor utilized in the ink will determine in large measure the degree of thickness of the noncellular layer. Particularly good results have been obtained with ink composition from 1 to about 25 percent of the inhibitor on the total weight of liquid ink. As can be seen by reference to FIG. 5, the thickness of the noncellular layer increases with the concentration of inhibitor applied to the surface. In the illustration, trimellitic anhydride is utilized as the inhibitor, applied by a printing roll made from a one hundred-and-twenty-line screen and having cells of approximately 50 microns in depth. The trimellitic anhydride was deposited in a liquid ink containing about one-fifth of the concentration of trimellitic anhydride (TMA) indicated in the graph on a wet basis, i.e., 25% of TMA on a dry basis was deposited from an ink containing 5% TMA. Care should be exercised in the concentration of the inhibitor which penetrates into the foamable composition since the majority of the inhibitors are accelerators for the blowing agent. If more than enough is present to react with the accelerator, than the excess can then serve as an accelerator for the blowing agent to defeat the purpose of the inhibitor.

After the application of the inhibitor, the foamable composition is heated to a temperature sufficient to fuse the resin by completely solvating the resin with plasticizer and to decompose the blowing agent. The temperature of the entire mass of composition upon the backing must attain the fusion temperature of the resin in order to obtain a product of maximum strength. Using the preferred vinyl resin, fusion is attained at a temperature of about 300° F. to about 375° F. In addition, the entire mass of foamable composition must be heated to a point where the blowing agent is decomposed. When the preferred high temperature blowing agent is used, foaming does not occur until the resinous composition has been fused. The heating must be carried out, however, at a temperature which allows decomposition of the blowing agent only in the areas desired.

If volatile components are used in the compositions, care must be taken that they are essentially completely removed from the film prior to fusion. This can be accomplished by heating the composition at a temperature substantially below the fusion temperature and minimum decomposition temperature of the blowing agent for sufficient time to remove the volatile material. For example, if 5 percent of V. M. & P. Naphtha (Boiling Range 190–275° F.) is used, heating at 200° F. for 5 minutes will remove sufficient material so that fusion and blowing at 400° F. can be accomplished with good cell structure and freedom from blisters.

Heating in order to effect fusion and foaming can be brought about in a forced hot air oven; however, other types of heating can be used. For example, the product can be passed beneath radiant heating elements; alternately, di-electric heating can be used.

Figure 6:
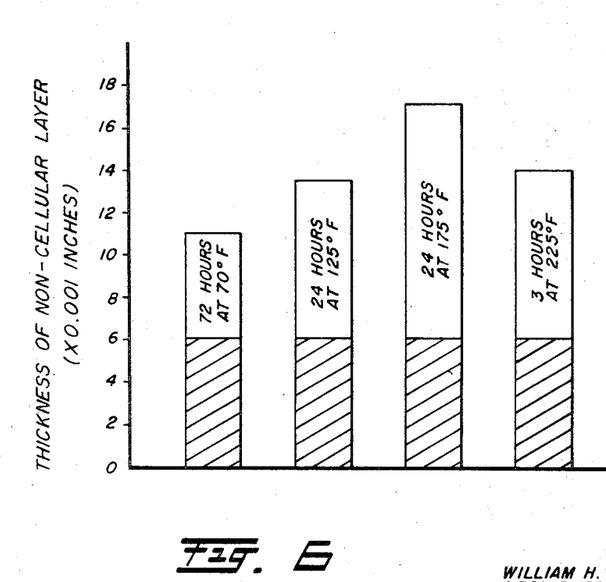
FIG. 6 is a graph which shows the relationship of the thickness of noncellular layer and heating at various temperatures prior to decomposing the blowing agent. The cross-hatched portion shows the thickness obtained if the composition is heated to decomposition temperature in a normal blowing cycle. The times indicated is that required at that temperature to obtain the maximum thickness of the noncellular layer. Additional heating will not increase the thickness. This graph relates to a typical foamable resinous composition.

As shown in FIG. 6, the penetration of the inhibitor can be controlled by subjecting the foamable composition (100 parts of polyvinyl chloride, 57 parts of plasticizer, 2.53 parts of azodicarbonamide, 1.11 parts of dibasic lead phosphite) of 0.025 inch in thickness coated with the inhibitor to an aging cycle. This aging can take place at room temperature (70° F.) or preferably in the range of 150° F. to 200° F. for a period of preferably from 1 to 30 hours. Utilizing trimellitic anhydride as the ink with a concentration of 32% on a dry bases, a penetration of approximately 0.006 inch can be obtained. If this composition is held at 70° F. for a period of 72 hours, a maximum effective penetration of approximately 0.011 inch can be obtained. If the temperature is raised to 125° F., the penetration can be increased to approximately 0.0135 inch after 24 hours. At 175° F., a maximum effective penetration of approximately 0.017 inch can be obtained if held up to 24 hours. Aging temperature of above 200° F. should be carefully utilized since the composition will start to blow on prolonged heating.

The foamed and fused product after leaving the heating oven is permitted to cool. Cooling is particularly important since any premature handling of the product immediately after foaming might cause partial collapse and distortion of the foam structure. Cooling can be brought about by mere exposure of the product to the atmosphere; thus, the speed of motion of the backing along the processing apparatus and the spacing between the fusion oven and the end of the apparatus can be adjusted so that the product is given sufficient time to cool. Alternately, cooling can be accelerated by blowing jets of cooled air upon the fused and foamed composition or by means of fine sprays of water upon the fused and foamed composition or by utilizing cooling rolls.

After being cooled, the product is withdrawn from the processing apparatus. It can be used in the form of a sheet as produced or can be cut into tiles or other appropriate shapes depending on the particular use to which the product is to be put. Products produced in accordance with the invention have the characteristics of excellent resilience, depending in part on the thickness of the foam layer.

As indicated above, the foamable composition can be first formed into a self-supporting sheet or other shape before decomposition of the blowing agent. A typical method for forming a calendered preformed sheet is disclosed in U.S. Pat. No. 2,964,799, issued Dec. 20, 1960 to P. E. Roggi et al. In accordance with the disclosure in this patent, a high temperature blowing agent such as azodicarbonamide (1,1'-azobisformamide) is utilized. The resinous composition is mixed in a Banbury mixer or the like to fuse the composition and the fused composition is then passed through calender rolls to form a sheet of the desired thickness. This sheet can be self-supporting and, in accordance with the present invention, is passed to an apparatus which applies the chemical inhibitor to one or both surfaces. The sheet is then heated to decompose the blowing agent which is not in contact with the inhibitor thereby producing a product having a surface of non-cellular composition and a cellular layer. The sheet can be laminated to a backing or wear layer prior to or after the decomposition of the blowing agent. As indicated, the same procedure can be used to form various shapes by substituting for the calender, an extruder, press, mold or other type of forming apparatus.

The following examples are given for purposes of illustration:

The following are typical foamable compositions:

EXAMPLE 1

| | Parts |
|---|---|
| Polyvinyl chloride (specific viscosity 0.40) | 100 |
| Butyl benzyl phthalate | 78 |
| TiO$_2$ | 5.29 |
| Zinc oxide | 1.11 |
| Azodicarbonamide | 2.53 |
| Diphenyl decyl phosphite | 3 |
| Epoxidized esterified tallate (monomeric plasticizer) | 5 |

EXAMPLE 2

| | Parts |
|---|---|
| Polyvinyl chloride (specific viscosity 0.40) | 50 |
| Polyvinyl chloride blending resin (specific viscosity 0.40-particle size 10–100 microns) | 25 |
| Polyvinyl chloride (specific viscosity 0.60) | 25 |
| Butyl benzyl phthalate | 58 |
| TiO$_2$ | 5.29 |
| Zinc oxide | 1.11 |
| Azodicarbonamide | 2.53 |
| Naphtha (boiling range 310–400° F.) | 1.55 |

EXAMPLE 3

| | Parts |
|---|---|
| Polyvinyl chloride (specific viscosity 0.40) | 100 |
| Butyl benzyl phthalate | 79 |
| TiO$_2$ | 5.29 |
| Zinc oxide | 1.28 |
| Diphenyl decyl phosphite | 3.00 |
| Azodicarbonamide | 2.92 |
| Epoxidized esterified tallate (monomeric plasticizer) | 5 |

EXAMPLE 4

| | Parts |
|---|---|
| Polyvinyl chloride (specific viscosity 0.40) | 100 |
| Butyl benzyl phthalate | 78 |
| TiO$_2$ | 5.29 |
| Zinc oxide | 0.64 |
| Diphenyl decyl phosphite | 3.00 |
| Azodicarbonamide | 2.92 |
| Epoxidized esterified tallate (monomeric plasticizer) | 5 |

EXAMPLE 5

| | Parts |
|---|---|
| Polyvinyl chloride (specific viscosity 0.40) | 100 |
| Butyl benzyl phthalate | 57 |
| TiO$_2$ | 5.29 |
| Azodicarbonamide | 2.53 |
| Dibasic lead phosphite | 0.56 |
| Naphtha (boiling range 310–400° F.) | 1.55 |

EXAMPLE 6

| | Parts |
|---|---|
| Polyvinyl chloride (specific viscosity 0.40) | 100 |
| Butyl benzyl phthalate | 57 |
| TiO$_2$ | 5.29 |
| Azodicarbonamide | 2.53 |
| Dibasic lead phosphite | 1.11 |
| Naphtha (boiling range 310–400° F.) | 1.55 |

EXAMPLE 7

| | Parts |
|---|---|
| Polyvinyl chloride (specific viscosity 0.40) | 100 |
| Dioctyl phthalate | 57 |
| TiO$_2$ | 5.29 |
| Azodicarbonamide | 2.53 |
| Dibasic lead phosphite | 1.11 |
| Naphtha (boiling range 310–400° F.) | 1.55 |

EXAMPLE 8

| | Parts |
|---|---|
| Polyvinyl chloride (specific viscosity 0.40) | 100 |
| Butyl benzyl phthalate | 58 |
| TiO$_2$ | 5.29 |
| Azodicarbonamide | 3.79 |
| Dibasic lead phosphite | 0.56 |
| Naphtha (boiling range 310–400° F.) | 1.55 |

EXAMPLE 9

| | Parts |
|---|---|
| Polyvinyl chloride (specific viscosity 0.40) | 100 |
| Butyl benzyl phthalate | 57 |
| TiO$_2$ | 5.29 |
| Azodicarbonamide | 2.53 |
| Naphtha (boiling range 310–400° F.) | 1.55 |
| Lead subacetate | 0.925 |

EXAMPLE 10

| | Parts |
|---|---|
| Polyvinyl chloride (specific viscosity 0.40) | 50 |
| Polyvinyl chloride (specific viscosity 0.60) | 50 |
| Butyl benzyl phthalate | 58 |
| TiO$_2$ | 5.29 |
| Zinc oxide | 1.11 |
| Azodicarbonamide | 2.53 |
| Naphtha (Boiling Range 10–400° F.) | 1.55 |

EXAMPLE 11

| | Parts |
|---|---|
| Polyvinyl chloride (specific viscosity 0.40) | 100 |
| Butyl benzyl phthalate | 53 |
| TiO$_2$ | 5.29 |
| Zinc Oxide | 0.83 |
| Azodicarbonamide | 2.53 |
| Epoxidized esterified tallate | 5 |
| Diphenyl decyl phosphite | 3 |
| Naphtha (Boiling Range 310–400° F.) | 1.55 |

EXAMPLE 12

| | Parts |
|---|---|
| Polyvinyl chloride (specific viscosity 0.40) | 100 |
| Butyl benzyl phthalate | 53 |
| $TiO_2$ | 5.29 |
| Azodicarbonamide | 2.53 |
| Diphenyl decyl phosphite | 3 |
| Epoxidized esterified tallate | 5 |
| Dibasic lead phosphite | 0.83 |
| Naphtha (Boiling Range 310–400° F.) | 1.55 |

EXAMPLE 13

| | Parts |
|---|---|
| Polyvinyl chloride (specific viscosity 0.40) | 50 |
| Polyviny chloride blending resin (specific viscosity 0.40—particle size 10–100 microns) | 25 |
| Polyvinyl chloride (specific viscosity 0.60) | 25 |
| Butyl benzyl phthalate | 57 |
| $TiO_2$ | 5.29 |
| Azodicarbonamide | 2.53 |
| Dibasic lead phosphite | 1.11 |
| Naphtha (Boiling Range 310–400° F.) | 1.55 |

EXAMPLE 14

| | Parts |
|---|---|
| Polyvinyl chloride (specific viscosity 0.40) | 75 |
| Polyvinyl chloride blending resin (specific viscosity 0.40—particle size 10–100 microns) | 25 |
| Butyl benzyl phthalate | 58 |
| $TiO_2$ | 5.29 |
| Zinc oxide | 1.11 |
| Azodicarbonamide | 2.53 |
| Naphtha (Boiling Range 310–400° F.) | 1.55 |

EXAMPLE 15

| | Parts |
|---|---|
| Polyvinyl chloride (specific viscosity 0.40) | 75 |
| Polyvinyl chloride blending resin (specific viscosity 0.40—particle size 10–100 microns) | 25 |
| Butyl benzyl phthalate | 57 |
| $TiO_2$ | 5.29 |
| Azodicarbonamide | 2.53 |
| Dibasic lead phosphite | 1.11 |
| Naphtha (Boiling Range 310–400° F.) | 1.55 |

EXAMPLE 16

| | Parts |
|---|---|
| Polyvinyl chloride (specific viscosity 0.40) | 100 |
| Butyl benzyl phthalate | 52.5 |
| $TiO_2$ | 5.29 |
| Azodicarbonamide | 2.53 |
| Epoxidized esterified tallate | 5 |
| Naphtha | 1.55 |
| Cadmium oxide | 1.1 |

EXAMPLE 17

| | Parts |
|---|---|
| Polyvinyl chloride (specific viscosity 0.40) | 100 |
| Butyl benzyl phthalate | 52.5 |
| $TiO_2$ | 5.29 |
| Azodicarbonamide | 2.53 |
| Epoxidized esterified tallate | 5 |
| Naphtha | 1.55 |
| Cadmium acetate | 1.10 |

The following are typical ink formulations:

EXAMPLE 18

| | Parts |
|---|---|
| VYNS [1] | 2.280 |
| Methyl ethyl ketone | 17.720 |
| Trimellitic anhydride (5% on wet basis) | 1.052 |

[1] Copolymer of 90% vinyl chloride and 10% vinyl acetate.

EXAMPLE 19

| | Parts |
|---|---|
| VYNS | 2.280 |
| Methyl ethyl ketone | 17.720 |
| Trimellitic anhydride (2.5% on wet basis) | 0.513 |

EXAMPLE 20

| | Parts |
|---|---|
| VYNS | 2.280 |
| Methyl ethyl ketone | 17.720 |
| Trimellitic anhydride (10% on wet basis) | 2.22 |

EXAMPLE 21

| | Parts |
|---|---|
| VYNS | 2.280 |
| Methyl ethyl ketone | 17.720 |
| Trimellitic anhydride (1.75% on wet basis) | 0.356 |

EXAMPLE 22

| | Parts |
|---|---|
| VYNS | 2.28 |
| Methyl ethyl ketone | 17.72 |
| Trimellitic anhydride (1% on wet basis) | 0.202 |

EXAMPLE 23

| | Parts |
|---|---|
| VYNS | 2.28 |
| Methyl ethyl ketone | 17.72 |
| Terephthaloyl chloride, (10% on wet basis) | 2.22 |

EXAMPLE 24

| | Parts |
|---|---|
| VYNS | 2.28 |
| Methyl ethyl ketone | 17.72 |
| Dichloroisocyanuric acid (10% on wet basis) | 2.22 |

EXAMPLE 25

| | Parts |
|---|---|
| VYNS | 2.28 |
| Methyl ethyl ketone | 17.72 |
| Fructose (10% on wet basis) | 2.22 |

EXAMPLE 26

| | Parts |
|---|---|
| VYNS | 1.5 |
| Methyl ethyl ketone | 8.5 |
| Oxalic acid (10% on wet basis) | 0.53 |

EXAMPLE 27

| | Parts |
|---|---|
| VYNS | 1.5 |
| Methyl ethyl ketone | 8.5 |
| Fumaric acid (10% on wet basis) | 1.19 |
| Dioctyl phthalate | .56 |
| Butyl benzyl phthalate | .14 |

EXAMPLE 28

The foamable plastisol of Example 1 is applied as a uniform coating of about .0295 inch in thickness on the surface of an asbestos sheet having a thickness of 0.035 inch. The asbestos sheet was impregnated with about 30% by weight of a synthetic rubber. The plastisol coating is then heated to a temperature of about 275° F. (oven temperature of 300° F.) for three minutes to gel the composition and then the gelled composition is cooled. The composition is then coated by means of a rotogravure cylinder having been etched with a 120-line screen to a depth of 50 microns to apply a uniform application of the ink of Example 18. The coated composition is then heated in an oven at 390° F. for a period of two and one-sixth minutes (composition temperature less than 375° F.) to fuse the composition and decompose the lower stratum of blowing agent. The resulting product had a uniform non-cellular upper layer of 0.0075 inch and a uniform cellular lower layer of about 0.066 inch.

Following the procedure of Example 28, additional products were prepared as shown in Table 5, except that in some instances, as noted, the gelled layer after coating with the ink and prior to decomposition of the blowing agent was subjected to a post print heat cycle.

TABLE 5.—PRODUCT EXAMPLES

| | Example No. | | | | | | | | | | |
|---|---|---|---|---|---|---|---|---|---|---|---|
| | 29 | 30 | 31 | 32 | 33 | 34 | 35 | 36 | 37 | 38 | 39 |
| Plastisol Example No | 2 | 3 | 4 | 5 | 6 | 6 | 6 | 6 | 6 | 7 | 8 |
| Gel thickness, inches | 23.9 | 28.5 | 30 | 22.9 | 24.4 | 23.5 | 24.3 | 20 | 20 | 24.5 | 24.2 |
| Oven temperature, °F | 300 | 300 | 300 | 300 | 300 | 300 | 300 | 300 | 300 | 300 | 300 |
| Heating time, mins | 3 | 3 | 3 | 3 | 3 | 3 | 3 | 2 | 2 | 3 | 3 |
| Ink, Example No | 19 | 18 | 18 | 18 | 18 | 18 | 18 | 27 | 26 | 18 | 18 |
| Post print heat: | | | | | | | | | | | |
| Oven temp., °F | | 300 | | | | 175 | 300 | | 300 | 300 | |
| Heating time, mins | | 5 | | | | 180 | 6 | | 3 | 6 | |
| Blow: | | | | | | | | | | | |
| Oven temp., °F | 390 | 390 | 390 | 390 | 390 | 390 | 390 | 395 | 395 | 390 | 390 |
| Heating time, mins | 2 | 2½ | 2½₂ | 2 | 15⁵⁄₆₀ | 15⁵⁄₆₀ | 1¾ | 2¼ | 2¼ | 2 | 2 |
| Final product: | | | | | | | | | | | |
| Cellular foam thickness, X0.001 inch | 89 | 64 | 75 | 39 | 51 | 19 | 33 | 37 | 38 | 52 | 43 |
| Non-cellular layer thickness, X0.001 inch | 5 | 11 | 9 | 11 | 8 | 15½ | 12½ | 6½ | 10 | 11 | 11½ |

| | Example No. | | | | | | | | | |
|---|---|---|---|---|---|---|---|---|---|---|
| | 40 | 41 | 42 | 43 | 44 | 45 | 46 | 47 | 48 | 49 |
| Plastisol Example No | 9 | 10 | 11 | 11 | 12 | 13 | 14 | 15 | 16 | 17 |
| Gel thickness, inches | 23.3 | 26 | 23.3 | 23 | 22.4 | 24.9 | 23.5 | 23.3 | 24 | 22.5 |
| Over temperature, °F | 300 | 300 | 300 | 300 | 300 | 300 | 300 | 300 | 300 | 300 |
| Heating time, mins | 3 | 3 | 3 | 3 | 3 | 3 | 3 | 3 | 3 | 3 |
| Ink, Example No | 18 | 19 | 24 | 25 | 23 | 21 | 19 | 20 | 18 | 18 |
| Post print heat: | | | | | | | | | | |
| Oven temp., °F | | 125 | 300 | | 300 | | | | 300 | 300 |
| Heating time, mins | | 1440 | 6 | | 6 | | | | 6 | 6 |
| Blow: | | | | | | | | | | |
| Oven temp., °F | 390 | 390 | 390 | 390 | 390 | 395 | 390 | 390 | 390 | 390 |
| Heating time, mins | 2½ | 1¾ | 15⁵⁄₆₀ | 1¾ | 2½ | 2 | 15⁵⁄₆₀ | 2 | 2 | 2¼ |
| Final product: | | | | | | | | | | |
| Cellular foam thickness, X0.001 inch | 66 | 17 | 80 | 68 | 46 | 84 | 45 | 62 | 44 | 31 |
| Non-cellular layer thickness, X0.001 inch | 4 | 17 | 3.3 | 3 | 6 | 4 | 12 | 7½ | 9 | 10 |

Any of the products produced by Examples 28 to 49 can have a textured or embossed surface by utilizing the procedure described in U.S. Pat. No. 3,293,108 issued to Nairn et al. on Dec. 20, 1966, in conjunction with the procedure of these examples.

Any departure from the foregoing description which conforms to the invention is intended to be included within the scope of the claims.

What is claimed is:

1. In the process for producing a resinous cellular layer which comprises incorporating a thermally decomposable chemical blowing agent and an accelerator for lowering the decomposition temperature of said blowing agent in a foamable resinous composition, forming said foamable resinous composition into a solid layer on a base and subsequently heating said solid layer to decompose said blowing agent, the improvement which comprises producing said cellular layer having a noncellular surface stratum of substantially uniform thickness of at least 0.003 inch over the entire surface of said layer by utilizing as said accelerator a compound which is substantially insoluble in said foamable resinous composition, applying to said surface prior to decomposing said blowing agent a uniform layer of a composition containing an inhibitor which is soluble in at least one component of the foamable composition and capable of penetrating into said layer and preventing said accelerator from lowering the decomposition temperature of said blowing agent in the area of its penetration during said heating and controlling the extent of said heating to decompose the blowing agent without decomposing the portion of the blowing agent in the area of penetration of said inhibitor, the amount of said inhibitor whch penetrates into said layer being insufficient to prevent the decomposition of all of said blowing agent.

2. The process of claim 1 wherein said blowing agent is azodicarbonamide.

3. The process of claim 2 wherein said insoluble accelerator is selected from the group consisting of lead, zinc and cadmium compounds.

4. The process of claim 3 wherein said accelerator is zinc oxide.

5. The process of claim 3 wherein said accelerator is dibasic lead phosphite.

6. The process of claim 3 wherein said accelerator is cadmium oxide.

7. The process of claim 3 wherein said accelerator is cadmium acetate.

8. The process of claim 3 wherein said accelerator is lead oxide.

9. The process of claim 3 wherein said accelerator is lead subacetate.

10. The process of claim 3 wherein said inhibitor is selected from the group consisting of organic acids and acid-yelding compounds.

11. The process of claim 10 wherein said inhibitor is an organic acid.

12. The process of claim 10 wherein said inhibitor is trimellitic anhydride.

13. The process of claim 10 wherein said inhibitor is fumaric acid.

14. The process of claim 10 wherein said inhibitor is oxalic acid.

15. The process of claim 10 wherein said inhibitor is terephthaloyl chloride.

16. The process of claim 10 wherein said inhibitor is dichloroisocyanuric acid.

17. The process of claim 10 wherein said inhibitor is fructose.

References Cited

UNITED STATES PATENTS

| | | | |
|---|---|---|---|
| 2,918,702 | 12/1959 | Wetterau | 156—78 |
| 3,293,094 | 12/1966 | Nairn et al. | 117—76X |
| 3,293,108 | 12/1966 | Nairn et al. | 117—76X |
| 3,365,353 | 1/1968 | Witman | 161—160X |
| 3,399,107 | 8/1968 | Biskup et al. | 156—79X |
| 3,433,700 | 3/1969 | Migdol et al. | 156—79X |
| 3,458,337 | 7/1969 | Rugg | 117—76 |

WILLIAM D. MARTIN, Primary Examiner

M. R. P. PERRONE, Jr., Assistant Examiner

U.S. Cl. X.R.

117—10, 75, 76, 138.8, 161